United States Patent
Kanuri et al.

(10) Patent No.: US 6,807,179 B1
(45) Date of Patent: Oct. 19, 2004

(54) TRUNKING ARRANGEMENT IN A NETWORK SWITCH

(75) Inventors: Mrudula Kanuri, Santa Clara, CA (US); Bahadir Erimli, Campbell, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/551,554

(22) Filed: Apr. 18, 2000

(51) Int. Cl.[7] ................................................ H04J 12/56
(52) U.S. Cl. ............................ 370/395.31; 370/395.32; 370/230
(58) Field of Search .................. 370/395.31, 395.32, 370/395.52, 395.53, 401, 402, 403, 409, 422, 230

(56) References Cited

U.S. PATENT DOCUMENTS 5,953,335 A    9/1999 Erimli et al.
6,151,297 A  * 11/2000 Congdon et al. ............ 370/216

* cited by examiner

Primary Examiner—Wellington Chin
Assistant Examiner—William Schultz
(74) Attorney, Agent, or Firm—Manelli Denison & Selter PLLC; Leon R. Turkevich

(57) ABSTRACT

A network switch includes network switch ports, and switching logic for determining the output port for each received layer 2 type data packet. The switching logic includes an address table configured for storing address-based switching decisions, a trunk table configured for assigning each network switch port to a corresponding identified trunk, and a trunk distribution table identifying the network switch ports assigned to each identified trunk. The switching logic determines the output port for each corresponding received layer 2 type data packet based on a corresponding switching decision for the received layer 2 type data packet, and based on selection of an entry in the trunk distribution table based on information within the received layer 2 type data packet. Hence, the network switch is able to perform trunk-based switching with minimal complexity, ensuring switching of data packets at the wire rate.

18 Claims, 3 Drawing Sheets

TRUNKING ARRANGEMENT IN A NETWORK SWITCH

BACKGROUND OF THE INVENTION

1. Field of the Invention

The present invention relates to switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of layer 2 type data packets. A layer 2 type data frame (also referred to as a layer 2 type data packet) is defined as a data frame having a layer 2 header (e.g., Ethernet), a corresponding payload, and a cyclic redundancy check field (also referred to as a frame check sequence field) having a value based on the layer 2 header and the corresponding payload. The fill-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received layer 2 type data packet may include a VLAN (virtual LAN) tagged frame according to IEEE 802.1p (802.1D) protocol that enables the network switch to perform more advanced switching operations. For example, the VLAN tag may specify another subnetwork (via a router) or a prescribed group of stations.

A newer protocol, known as IEEE 802.1ad, specifies a trunking technique that enables two or more point-to-point connections between the same two devices to be treated as a single network link. Trunking can be used to obtain linearly incremental bandwidth in unit multiples, and provides load sharing so that client traffic may be distributed across multiple links; if one of the links fails, link aggregation will converge to a new configuration. The protocol IEEE 802.1ad specifies certain requirements, for example packets belonging to the same conversation may not be reordered, although conversations may be moved among ports within an aggregation, both for load sharing and for availability; in addition, mechanisms for trunking cannot support aggregations among the more than two systems. In addition, IEEE 802.1ad specifies that link aggregation is supported only on point-to-point links using IEEE 802.3 MACs in full duplex mode and each operating at the same data rate.

As described above, the increasing demands for improved performance on an integrated network switch affects the complexity, size, performance, and hence cost of the integrated network switch. Hence, the addition of trunking support within an integrated network switch requires an efficient implementation that will not adversely affect the wire rate performance of the integrated network switch.

SUMMARY OF THE INVENTION

There is a need for an arrangement that enables a network switch to perform trunk-based switching of layer 2 type data packets. In particular, there is a need for an arrangement that enables a network switch to perform switching of layer 2 type data packets according to trunking protocols.

These and other needs are attained by the present invention, where a network switch includes network switch ports, and switching logic for determining the output port for each received layer 2 type data packet. The switching logic includes an address table configured for storing address-based switching decisions, a trunk table configured for assigning each network switch port to a corresponding identified trunk, and a trunk distribution table identifying the network switch ports assigned to each identified trunk. The switching logic determines the output port for each corresponding received layer 2 type data packet based on a corresponding switching decision for the received layer 2 type data packet, and based on selection of an entry in the trunk distribution table based on information within the received layer 2 type data packet. Hence, the network switch is able to perform trunk-based switching with minimal complexity, ensuring switching of data packets at the wire rate.

One aspect of the present invention provides a method in an integrated network switch having switch ports, the method comprising receiving a data frame by an integrated network switch, and generating a switching decision. The switching decision is generated by identifying a first output switch port from an address table based on address information within the data frame, identifying a trunk served by the first output switch port, and selecting from a trunk distribution table a final output switch port for the data frame based on the identified trunk and selected information within the data frame. The selection of a final output switch port from the trunk distribution table based on the identified trunk and selected information within the data frame enables data frames for a prescribed flow, as specified in the selected information, to be output to the same final output switch port of the identified trunk. In addition, the selection of a final output switch port from a trunk distribution table enables the output of data frames for an identified trunk to be evenly distributed across the output switch ports serving the identified trunk. Hence, trunk-based switching may be implemented in an integrated network switch with minimal complexity.

Another aspect of the present invention provides a network switch comprising a plurality of network switch ports, each configured for receiving a layer 2 type data frame, and a switching module. The switching module includes an address table configured for storing address table entries, each address table entry specifying a network address and at least one corresponding destination switch port. The switching module also includes a trunk distribution table configured for storing, for each of a plurality of identified trunks, the switch ports serving the corresponding identified trunk. The switching module is configured for selecting, from the trunk distribution table, a final output switch port for the received layer 2 type data frame based on identification of the corresponding identified trunk from the destination switch port for the received layer 2 type data frame, and based on a determined attribute in the layer 2 type data frame. The selection of a final output switch port from the trunk distribution table enables the switching module to manage trunk-based traffic based on identified flows and based on address information within the layer 2 type data frame with minimal complexity.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
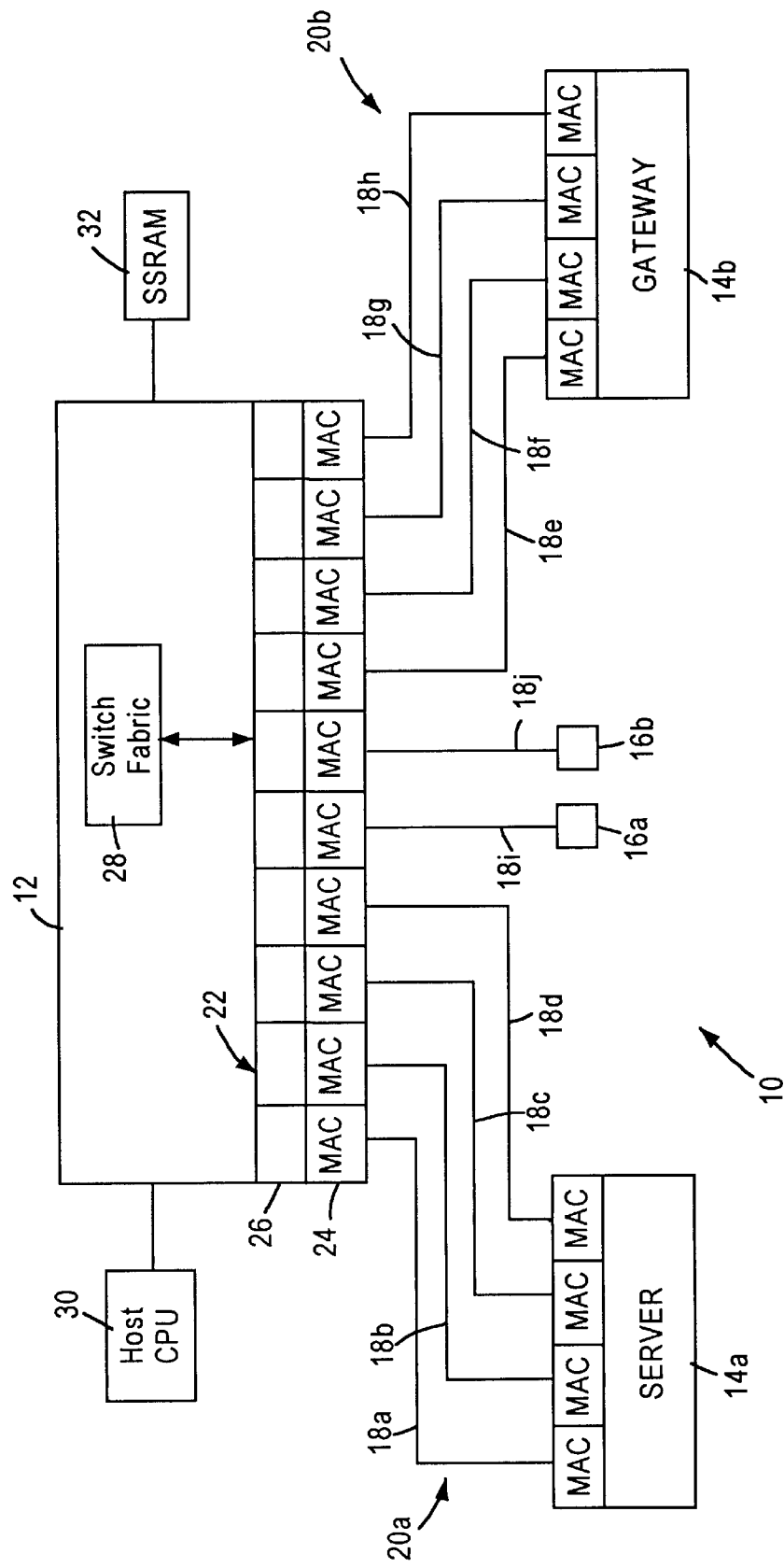
FIG. 1 is a block diagram of a packet switched network including a network switch configured for switching layer 2 type data packets on IEEE 802.1ad type trunks according to an embodiment of the present invention.

FIG. 1 is a block diagram illustrating a packet switched network 10, such as an Ethernet (IEEE 802.3) network. The packet switched network includes an integrated (i.e., single chip) multiport switch 12 that enables communication of layer 2 type data packets between network stations 14 and 16. Each network station 14 or 16 is typically configured for sending and receiving layer 2 type data packets at 10 Mbps or 100 Mbps according to IEEE 802.3 protocol.

The network stations 14, for example a server or gateway, are configured for sending and receiving layer 2 type data packets across multiple Ethernet links 18 configured to form trunks 20 according to IEEE 802.3ad protocol. For example, the server 14a implements the trunk 20a by utilizing, for example, four 100 Mbps Ethernet links 18a, 18b, 18c, and 18d; the gateway 14b implements the trunk 20b by utilizing, for example, the four 100 Mbps Ethernet links 18e, 18f, 18g, and 18h. In contrast, the network stations 16a and 16b, for example client workstations, each use respective 10/100 Mbps Ethernet links 18i and 18j for transfer of layer 2 type data packets according to IEEE 802.3 protocol. Hence, use of the trunks 20 by the respective network stations 14 increments the usable bandwidth based on the number of utilized Ethernet links 18, and improves transport reliability since the network station 14 can continue to transmit on remaining Ethernet links 18 of the trunk 20 if one of the links should fail.

The switch 12 includes network switch ports 22, and a switch fabric 28. Each network switch port 22 includes a media access control (MAC) module 24 that transmits and receives layer 2 type data packets to the associated network stations 14 or 16, and port filters 26. Each port filter 26, also referred to as a packet classifier, is configured for identifying a user-selected attribute of the layer 2 type data frame, described below, and outputting the relevant switching information (e.g., whether the user-selected attribute was detected) to the switch fabric 28. As described below, the switch fabric 28 is configured for making trunk-based layer 2 switching decisions for received layer 2 type data packets.

As shown in FIG. 1, the switch 12 has an associated host CPU 30 and a buffer memory 32, for example an SSRAM. The host CPU 30 controls the overall operations of the corresponding switch 12, including programming of the port filters 26 and the switch fabric 28. The buffer memory 32 is used by the corresponding switch 12 to store layer 2 type data frames while the switch fabric 28 is processing forwarding decisions for the received layer 2 type data packets.

The switch fabric 28 is configured for performing layer 2 switching decisions and switching decisions that implement user-defined switching policies; such user-defined switching policies may include supporting trunk-based traffic having a prescribed user-selected attribute, for example having been determined to belong to a prescribed flow, for example an IGMP media flow or other flow having a prescribed TCP source address and/port TCP destination address, or granting sufficient switch resources to ensure a guaranteed quality of service (e.g., reserved bandwidth or guaranteed latency).

According to the disclosed embodiment, each port filter 26 of FIG. 1 is configured for identifying user-selected attributes, from a received layer 2 type data frame, that are used by the switching logic 28 to perform trunk-based switching decisions. The port filter 26 can be implemented as a state machine that monitors the bytes coming in from the network, hence the state machine can analyze the layer 2 type data frame for the presence of prescribed user-selected attributes (e.g., TCP source port and/or TCP destination port) on a per-byte basis as the bytes of packet data of the data frame are received by the network switch port. In addition, the port filter 26 can be configured for multiple simultaneous comparisons of the incoming packet data with multiple templates that specify respective user-selected attributes, enabling the port filter 26 to simultaneously determine the presence of a plurality of user-selected attributes as the layer 2 type data frame is received.

Figure 2:
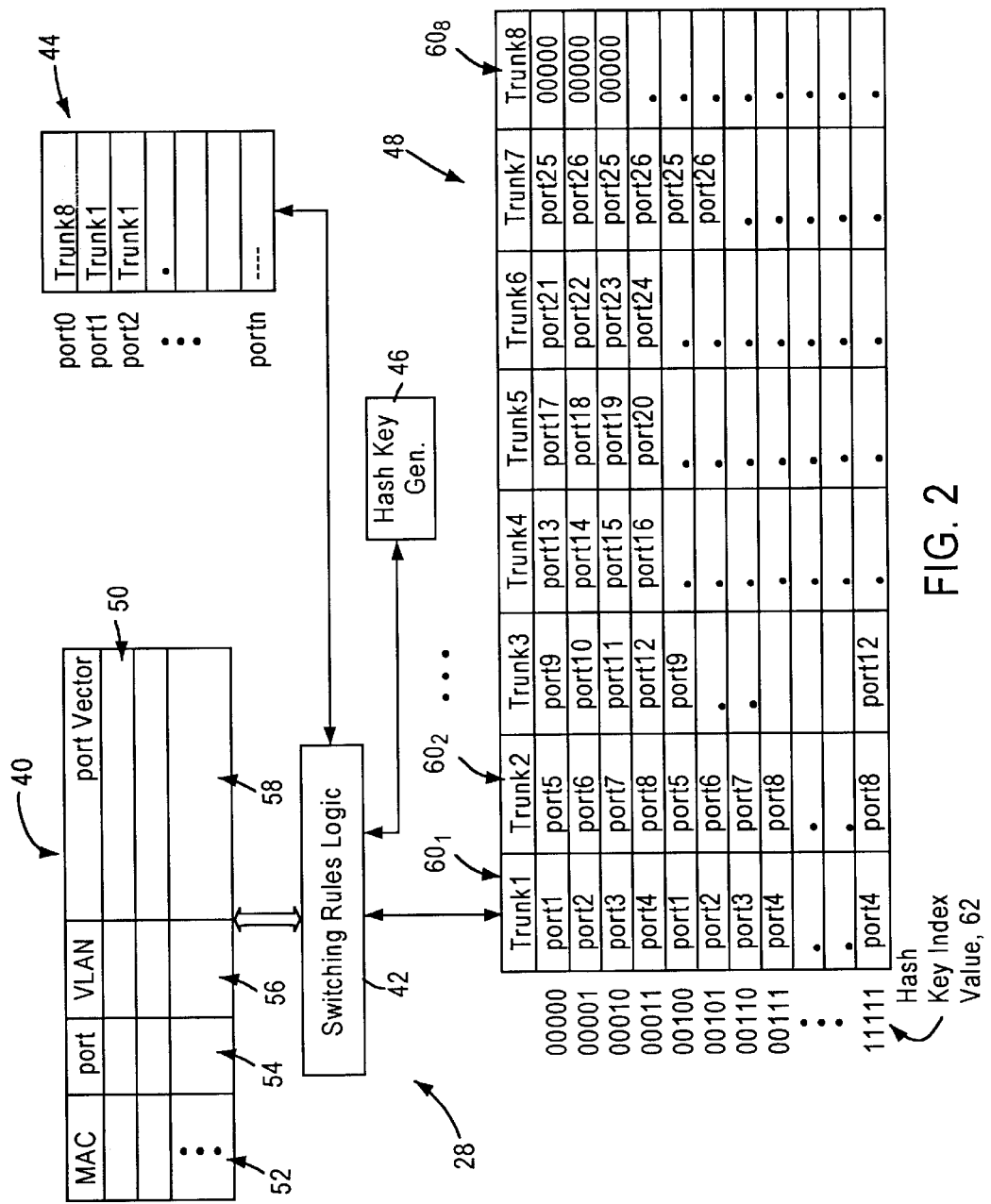
FIG. 2 is a block diagram illustrating in detail the switch fabric of FIG. 1.

FIG. 2 is a diagram illustrating the switch fabric 28 according to an embodiment of the present invention. The switch fabric 28 includes a layer 2 address table 40, switching logic 42, a trunk table 44, a hash key generator 46, and a trunk distribution table 48. The address table 40, the trunk table 44, and the trunk distribution table 40 are configured for storing entries, described below, that are stored (i.e., loaded) by the host CPU 30.

The address table 40 is configured for storing address table entries 50, each address table entry 50 specifying a MAC address 52, a network switch port field 54 that identifies the network switch port 22 serving the network node having the MAC address specified in the field 52. The address table entry 50 also is configured for storing a VLAN field 56, and a port vector field 58 that specifies at least one destination switch port 22, although multiple switch ports maybe specified for multicast or broadcast purposes.

The trunk table 44 is configured for storing, for each network switch port 22, a trunk identifier value that indicates which trunk a port 22 belongs to. In particular, the trunk table 44 is configured for storing the trunk identifier value on a per port basis, such that the trunk table 44 is addressed by the corresponding port number (e.g., binary address 00000 corresponds to port 0, address 00001 corresponds to port 1, etc.). Hence, the switching rules logic 42 can determine which trunk a port belongs to by accessing the trunk table by the corresponding port number.

The trunk distribution table 48 is a thirty-two row by eight column wide table configured for storing, for each of eight identified trunk fields 60, the switch ports 22 that serve the corresponding identified trunk 20. As illustrated in FIG. 2, switch ports 1–4 are assigned to "Trunk1" specified in trunk field $60_1$, switch ports 5–8 are assigned to "Trunk2" specified in trunk field 60₂, switch ports 5–8 are assigned to "Trunk3" specified in trunk field 60₃, etc. In addition, the assigned ports are stored by the host CPU 30 as a prescribed repeating sequence within the corresponding column 60 of the trunk distribution table 48, enabling the switching rules logic 42 to select any one of the ports 22 associated with a given trunk field 60 by generating a hash key index value 62 in the hash key generator 46 based on selected attributes within the received layer 2 type data frame, for example MAC source address, MAC destination address, TCP source port, and/or TCP destination port. Hence, the switching rules logic 42 accesses the trunk distribution table 48 by first determining a destination switch port from the address table 40. Upon determining the destination switch port from the port vector field 58 corresponding to a matched destination MAC address 52 or a VLAN field 56, the switching rules logic 42 determines the corresponding served trunk from the trunk table 44. Upon determining the output trunk from the trunk table 44, the switching rules logic 42 accesses the column for the identified output trunk 60 in the trunk distribution table 48, and accesses one of the rows of the table 48 based on the corresponding hash key index value 62 generated by the hash key generator 46.

Figure 3:
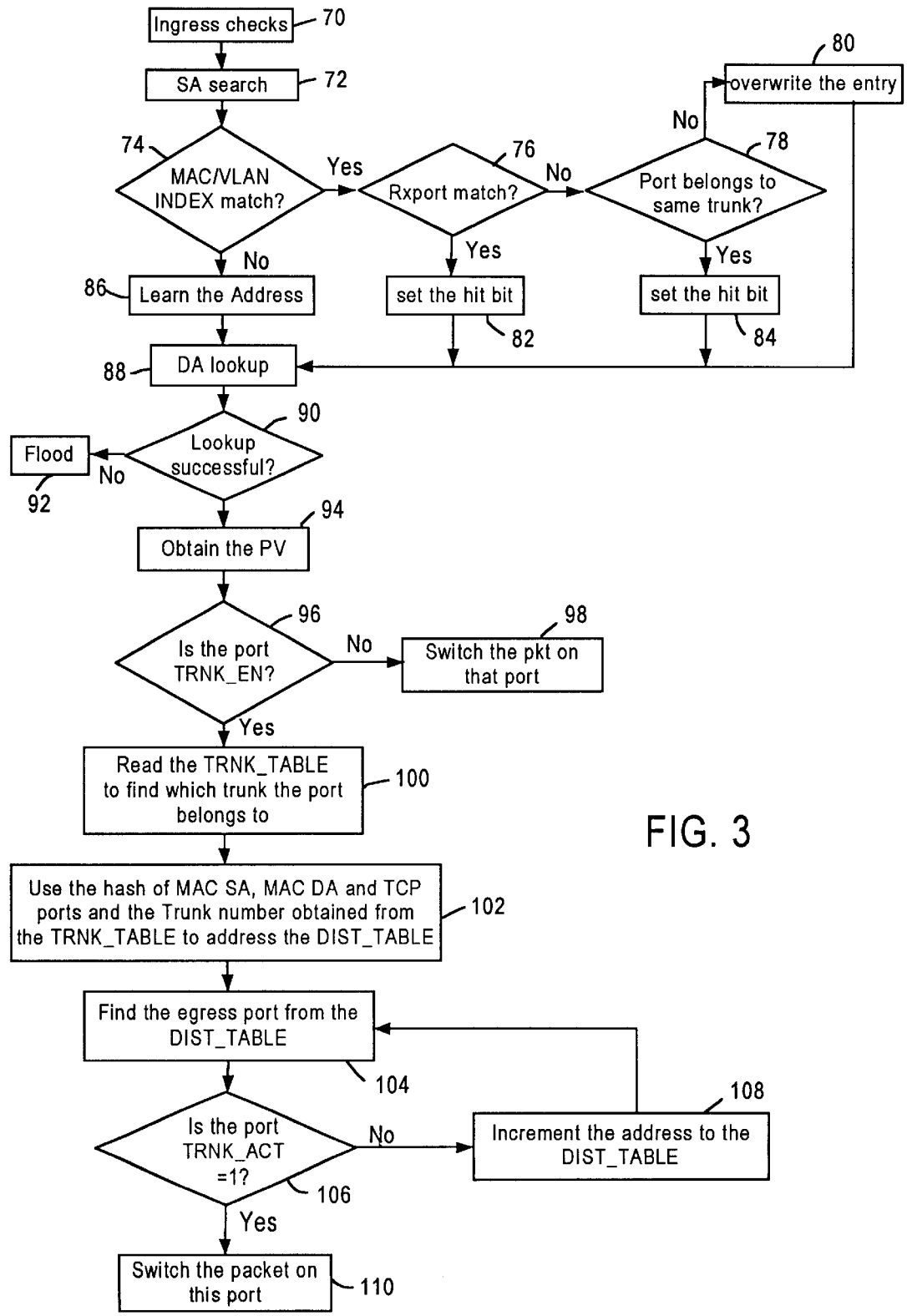
FIG. 3 is a diagram illustrating the method of generating a trunk-based switching decision by the switching fabric of FIGS. 1 and 2 according to an embodiment of the present invention.

FIG. 3 is a diagram illustrating the method generating trunk-based switching decisions by the switch fabric 28 according to an embodiment of the present invention. The method begins by the switching rules logic 42 receiving, from the switch port 22, layer 2 header information for the received data packet (including MAC source address, MAC destination address, VLAN information), and an indication from the corresponding packet classifier module 26 whether the received data packet includes a prescribed pattern corresponding to a prescribed data flow (e.g., by identifying TCP source port and/or TCP destination port). As described above, the host CPU 30 may program the port filter 26 of each network switch port 22 to identify any one of a plurality of prescribed patterns, such that the port filter 26 may be able to distinguish between IGMP frames, SMTP frames, LDAP frames, etc., as well as identify prescribed data flows. Alternatively, the switching rules logic 42 may include a parsing engine to identify the MAC addresses and the TCP ports.

The switching rules logic 42 performs an ingress check in step 70, for example by confirming according to prescribed ingress rules that the received data packet is a valid data frame. The switching rules logic 42 then searches the address table 40 in step 72 based on the source MAC address in the received data frame to confirm that the transmitting network node information is stored in the address table 40. If in step 74 the switching rules logic 42 determines a match between the source MAC address and/or the VLAN index with an address table entry 50, the switching rules logic 42 checks in step 76 whether the port field 54 matches the identifier of the switch port 22 having received the data packet; if there is no match, and if in step 78 the port does not belong to the same trunk, then the entry is overwritten in step 80, otherwise a hit bit is set in steps 82 or 84 to prevent subsequent deletion of the entry 50 by aging functions.

If in step 74 there is no match of the source MAC address or the VLAN index with any entry in the address table 40, the switching rules logic 42 learns the new address in step 86 and stores the new address information as a new entry in the address table 40.

The switching rules logic 42 then performs a destination MAC address lookup of the address table 40 in step 88. If in step 90 the destination address lookup is not successful, then all the network switch ports 22 are flooded with the layer 2 type data frame in step 92. If the switching rules logic 42 locates in step 90 the destination MAC address 52 within the address table 40, the switching rules logic 42 obtains the corresponding port vector 58 in step 94. As described above, the port vector 58 for the corresponding table entry 50 may specify at least one destination switch port.

The switching rules logic 42 then determines in step 96 whether the destination switch port specified in the port vector 58 is trunk enabled, for example by checking a port configuration register. If the destination switch port specified in the port vector 58 is not trunk enabled, then the received layer 2 type data frame is switched (i.e., output) back onto the network in step 98 by the destination switch port specified in the port vector 58.

If in step 96 the switching rules logic 42 determines that the destination switch port specified in the port vector 58 is trunk enabled, the switching rules logic 42 reads the trunk table 44 in step 100 to determine which trunk 20 the destination switch port belongs to. Once the switching rules logic 42 determines which trunk 20 the destination switch port belongs to, the switching rules logic 42 can access the corresponding trunk identifier field 60 in the trunk distribution table 48.

As described above, the switching rules logic 42 is able to select an output switch port, other than the destination switch port specified by the port vector 58, by selecting another switch port that belongs to the same trunk 20. In particular, the switching rules logic 42 generates a hash key index value 62 in step 102 by supplying to the hash key generator 46 the MAC source address, MAC destination address, TCP source port, and TCP destination port for the received layer 2 type data frame. The switching rules logic 42 uses the generated hash key index value 62 to obtain in step 104 the egress port (i.e., the final output switch port) for the trunk identified by the corresponding column 60. Hence, use of the generated hash key index value 62 to obtain the egress port ensures that data frames corresponding to the same data flow are output to the same egress port, while data frames going to the same destination but from either a different source or a different flow are output to another egress port in order to balance the load between the links 18 of the trunk 20.

The switching rules logic 42 checks whether the egress port obtained from the distribution table 48 is active in step 106; if the switching rules logic 42 determines that the egress port is inactive, indicating that the corresponding link 18 is not active between the network switch port 22 and the corresponding network node, then the switching rules logic 42 increments in step 108 the address to the distribution table 48 to select another switch port 22 as the final output switch port. However if the switching logic 42 determines in step 106 that the egress port is active, the data packet is switched (i.e. output) in step 110 on the final output switch port determined by the switching rules logic 42.

According to the disclosed embodiment, trunk-based switching of data packets is implemented in an integrated network switch using a trunk distribution table that enables egress port to be selected based on identification of switch ports assigned to an identified trunk, and based on information within the data packet that identifies whether the data packet is part of a prescribed data flow. Hence, trunk-based switching can be implemented in an integrated network switch with minimal complexity, ensuring that data packets can be switched at the wire rate.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated network switch having switch ports, the method comprising:

receiving a data frame by an integrated network switch;

generating a switching decision by identifying a first output switch port from an address table based on address information within the data frame, identifying a trunk served by the first output switch port, and selecting from a trunk distribution table a final output switch port for the data frame based on the identified trunk and selected information within the data frame.

2. The method of claim 1, further comprising outputting the data frame on the final output switch port based on a determined availability of the final output switch port.

3. The method of claim 1, wherein the step of identifying a first output switch port includes searching the address table for a table entry based on a destination address within the address information, and obtaining from the table entry an output port vector specifying at least the first output switch port.

4. The method of claim 3, wherein the searching step includes searching the address table based on a destination MAC address.

5. The method of claim 3, wherein the step of identifying a trunk served by the first output switch port includes accessing a trunk table that specifies, for each said switch port, a corresponding identified trunk.

6. The method of claim 5, wherein:

the trunk distribution table is configured for storing, for each of the identified trunks, the switch ports serving the corresponding identified trunk;

the step of selecting a final output switch port includes generating a hash key based on the selected information, and accessing a table entry specifying the final output switch port based on the identified trunk and the hash key.

7. The method of claim 6, wherein the step of generating a hash key includes generating the hash key based on data flow information within the selected information.

8. The method of claim 7, wherein the data flow information includes a TCP source port and a TCP destination port.

9. The method of claim 7, wherein the hash key is generated based on a MAC source address, a MAC destination address, a TCP source port, and a TCP destination port.

10. The method of claim 6, further comprising:

determining an availability of the final output switch port; and selecting another output switch port serving the identified trunk from the trunk distribution table based on a determined unavailability of the final output switch port.

11. The method of claim 6, further comprising storing by a host CPU the switch ports serving each corresponding identified trunk as a prescribed repeating sequence within a corresponding column of the trunk distribution table, the accessing step including accessing a selected row of the trunk distribution table at the column for the corresponding identified trunk, based on the hash key and a determined availability of the final output switch port.

12. A network switch comprising:

a plurality of network switch ports, each configured for receiving a layer 2 type data frame; and a switching module including:

(1) an address table configured for storing address table entries, each address table entry specifying a network address and at least one corresponding destination switch port, (2) a trunk distribution table configured for storing, for each of a plurality of identified trunks, the switch ports serving the corresponding identified trunk, the switching module configured for selecting, from the trunk distribution table, a final output switch port for the received layer 2 type data frame based on identification of the corresponding identified trunk from the destination switch port for the received layer 2 type data frame, and based on a determined attribute of the received layer 2 type data frame.

13. The system of claim 12, wherein each network switch port includes a packet classifier configured for determining a prescribed flow specified within the received layer 2 type data frame, the switching module selecting the final output switch port from the trunk distribution table based on the corresponding identified trunk and the prescribed flow.

14. The system of claim 12, wherein the switching module is configured for generating a hash key value based on MAC address information within the received layer 2 type data frame and the corresponding prescribed flow, the switching module accessing the trunk distribution table, for the corresponding identified trunk, based on the hash key value.

15. The system of claim 14, wherein the switching module selects the final output switch port based on a determined availability of an output switch port specified within the trunk distribution table at a location specified by the corresponding identified trunk and the hash key value.

16. The system of claim 14, wherein the switching module generates the hash key value based on a MAC source address, a MAC destination address, and the determined user-selected attribute including a TCP source port and TCP destination port.

17. The system of claim 12, wherein the switching module includes a trunk table configured for storing, for each said switch port, the corresponding identified trunk, the switching module determining the identified trunk for the received layer 2 type data frame based on accessing the trunk table for the corresponding destination switch port.

18. The method of claim 1, wherein the received data frame is a layer 2 type data frame and wherein each network switch port includes a packet classifier configured for determining a prescribed flow specified within the received layer 2 type data frame, the final output switch port being selected from the trunk distribution table based on the corresponding identified trunk and the prescribed flow.

* * * * *